No. 371,337. PATENTED NOV. 19, 1907.
J. G. & C. D. HAWLEY.
CHANGEABLE SPEED GEARING.
APPLICATION FILED MAR. 6, 1907.
2 SHEETS—SHEET 1.
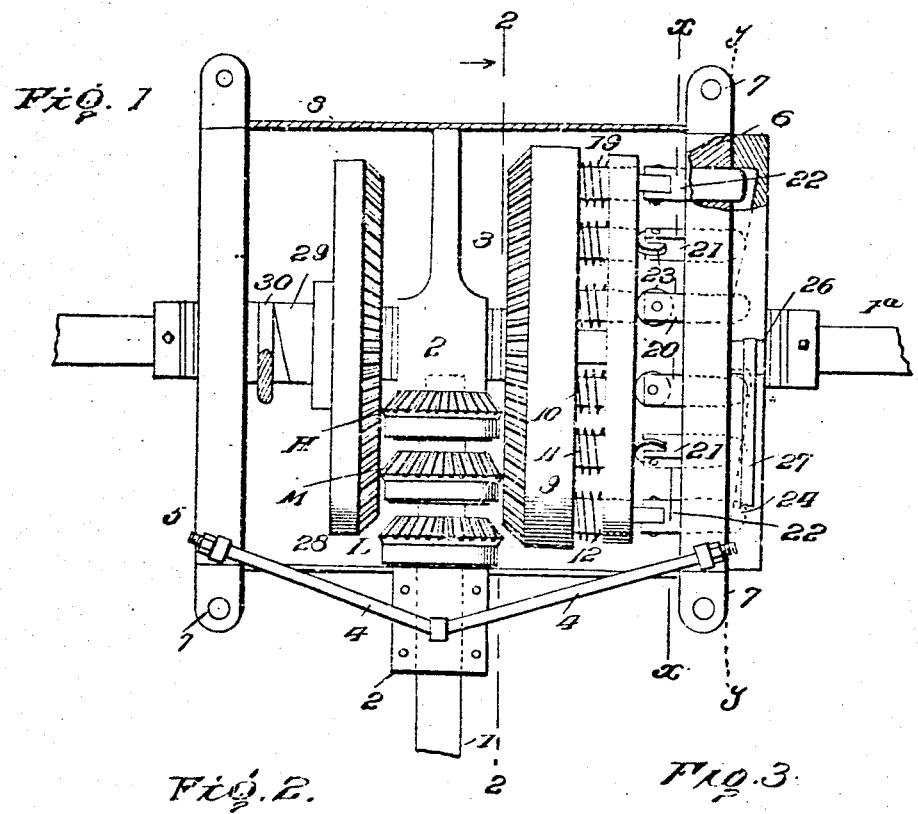
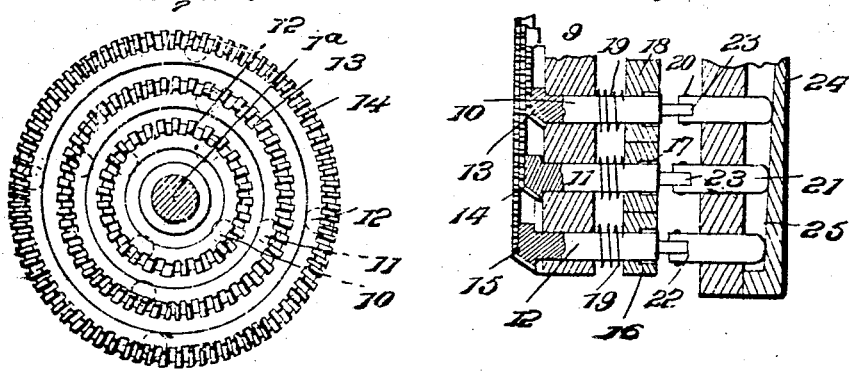
Witnesses
Inventors
J. G. Hawley
C. D. Hawley No. 871,337.
PATENTED NOV. 19, 1907.
J. G. & C. D. HAWLEY.
CHANGEABLE SPEED GEARING.
APPLICATION FILED MAR. 6, 1907.
2 SHEETS—SHEET 2.
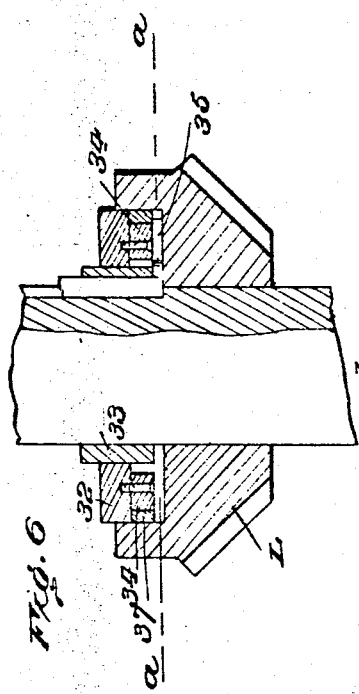
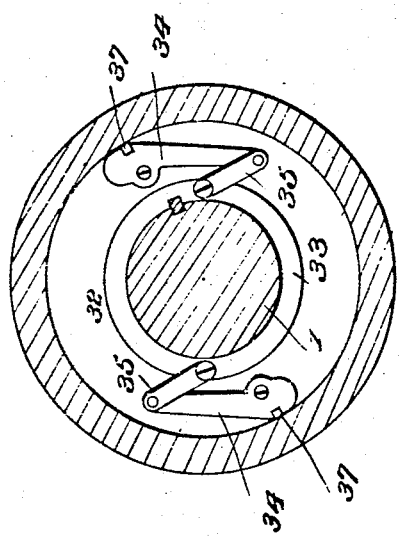
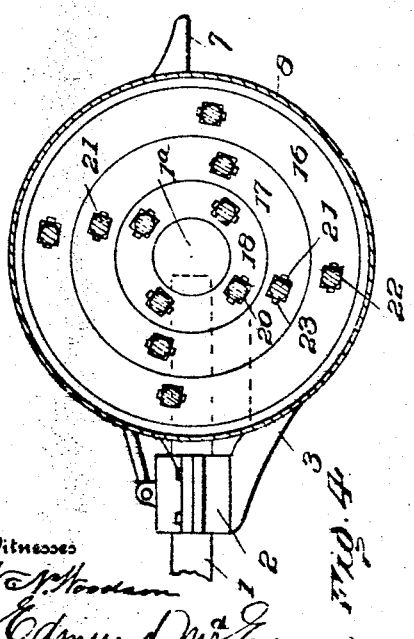
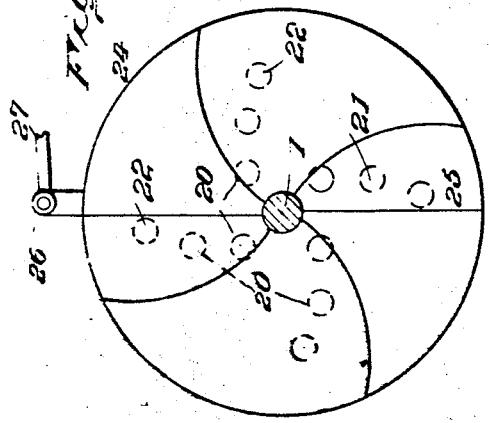
Witnesses
Inventor
J. G. Hawley
C. D. Hawley

UNITED STATES PATENT OFFICE.

JESSE G. HAWLEY AND CHARLES DOUGLAS HAWLEY, OF STRATFORD, CONNECTICUT.

CHANGEABLE-SPEED GEARING.

No. 871,337.    Specification of Letters Patent.    Patented Nov. 19, 1907.

Application filed March 6, 1907. Serial No. 360,911.

*To all whom it may concern:*

Be it known that we, JESSE G. HAWLEY and CHARLES DOUGLAS HAWLEY, citizens of the United States, residing at Stratford, in the county of Fairfield and State of Connecticut, have invented certain new and useful Improvements in Changeable-Speed Gearings, of which the following is a specification.

This invention contemplates certain new and useful improvements in power transmission mechanism for automobiles, motor boats, and for machinery generally, and the invention has for its object an improved construction of variable speed gearing which will transmit from a drive shaft to the driven shaft motion at different speeds in a simple and efficient manner and with a durable construction composed of comparatively few and simple parts.

The invention consists primarily in an improved variable speed gearing embodying a drive shaft, and a driven shaft, any desired number of gear elements on the drive shaft, and a corresponding number of gear elements operatively coupled to the driven shaft and arranged to be successively meshed with the gears of the drive shaft, one gear after another being thrown into meshing engagement without effecting the disengagement of the gears previously thrown into engagement, whereby a direct drive on all speeds is effected and all gears are allowed to be in mesh at the same time, thereby permitting the operator to change from a lower speed to a higher speed without throwing any of the gears out of mesh and losing the headway he has gained, and conversely permitting the operator or driver (say of an automobile) to take a lower speed on a hill or grade without danger of slipping back, as is the case where the gears must be thrown out in order to change.

The invention further consists in certain constructions, arrangements and combinations of the parts which we shall hereinafter fully describe and then point out the novel features in the appended claims.

For a full understanding of the invention and the merits thereof and also to acquire a knowledge of the details of construction of the means for effecting the result, reference is to be had to the following description and accompanying drawings, in which:

Figure 1 is a top plan view of my improved variable speed gearing, the gearing being shown in section; Fig. 2 is a transverse sectional view on the line 2—2 of Fig. 1; Fig. 3 is a fragmentary horizontal sectional view; Fig. 4 is a sectional view on the line x—x of Fig. 1; Fig. 5 is a face view of the cam disk in the nature of a diagrammatic view, the view being taken approximately as a section on the line y—y of Fig. 1; Fig. 6 is a detail sectional view on an enlarged scale, illustrating one form of clutch for the drive pinions; and, Fig. 7 is a sectional view thereof on the line a—a of Fig. 6.

Corresponding and like parts are referred to in the following description and indicated in all the views of the drawings by the same reference characters.

Referring to the drawings, the numeral 1 designates the drive shaft of my improved variable speed gearing, said shaft in the present instance being journaled at one end in a bearing 2 which is formed on the yoke 3, and which is braced by rods 4 connected at their outer ends to the heads 5 and 6. The said heads may be provided with outstanding ears 7, so that they may be fastened to the sub-frame of an automobile. 8 designates the body of the case within which the gear transmission mechanism is mounted.

H, M and L designate, respectively, three bevel pinions mounted on the drive shaft 1 and in spaced relation, the pinion H in the present instance being the high speed gear, the pinion M, the intermediate speed gear, and the pinion L the low speed gear. While I have shown three gears on the main shaft, and shall hereinafter describe my invention as embodied in mechanism capable of changing to three different speeds, it is manifest that the invention is not limited to any number of speeds.

The driven shaft 1ª may be connected to the rear wheels of an automobile by a chain or other connection (not shown) or in any desired way to the part to which it is intended to impart motion, and said driven shaft extends through the casing and is journaled therein by means of suitable thrust bearings and ball bearing thrust collars, as indicated in the drawings and extends at right angles to the drive shaft 1. A disk 9 is keyed or otherwise secured upon the driven shaft 1ª in proximity to the pinions H, M and L and ranging alongside of the peripheries of said pinions, and said disk is in the present instance formed with three series of apertures extending transversely therethrough and in which three sets of spokes 10, 11 and 12 are mounted to slide. The set of spokes 10 carries a bevel gear wheel 13 adapted to mesh with the high speed pinion H, the set of spokes 11 carries a larger bevel gear 14 adapted to mesh with the intermediate speed pinion M, and the set of spokes 12 carries a still larger bevel gear 15 adapted to mesh with the low speed pinion L. The bevel gears 13, 14 and 15 are in the form of concentric rings.

16, 17 and 18 designate, respectively, three concentric rings that are rigidly secured to the outermost ends of the respective sets of spokes 10, 11 and 12, and each one of the spokes is encircled by a spring 19, said springs, under normal conditions, if permitted to have free play, pressing the rings 16, 17 and 18 outwardly with respect to the disk 9, so as to carry the ring-like bevel gears 13, 14 and 15 out of engagement with the bevel pinions H, M and L.

A set of pins 20 is adapted to press the innermost ring 18 inwardly against the tension of the springs 19, an intermediate set of pins 21, concentric to the set 20, is designed for the same purpose with respect to the intermediate rings 17 and an outer set 22, serves the same function for the outermost ring 16. Each one of the pins 20, 21 and 22 carries an antifriction wheel or roller 23 at its inner end designed to bear directly against its respective ring, and each set of these pins is in registry with its respective ring, as clearly illustrated in the drawings. All of these pins are mounted to slide transversely through apertures formed to receive them in the head 6 of the casing, and they are provided with rounded ends protruding from said apertures on the outer face of said head and are designed to be engaged by the actuating cam disk 24. This disk is mounted to turn on the driven shaft 1ᵃ and is located against the outer face of the head 6 of the casing. The cam disk 24 is provided with four cam surfaces 25 that are adapted to engage the pins 22, the pins 21, and the pins 20, in succession, as said disk is turned in one direction. Any desired correlation between the different sets of pins and these cam surfaces may be arranged, so long as the pins will be pressed inwardly, one set after the other, without releasing any set, during the movement of the disk in one direction. In the present instance, as clearly illustrated in Fig. 5 which is in the nature of a diagrammatic view, it will be seen that I effect this successive movement by arranging or mounting the pins of each set in different radial lines from the other sets, and by forming the cam surface of the disk with their advancing edges extending radially to the disk. Hence, as the disk is turned in one direction, the cam surfaces 25 will first push in the outermost set of pins, will then push in the intermediate set of pins, while still holding the outermost set pushed in, and will finally push in the innermost set of pins while the other two sets are held in their pushed in condition. In order to turn the disk any means may be employed. In the present instance, we have shown the disk provided with a lug 26 to which one end of a link or connecting rod 27 is attached, said rod extending to a hand lever or foot pedal, (not shown).

28 designates a reverse gear wheel which is formed with bevel teeth, as shown, adapted to mesh with the low speed pinion L and which is splined on the driven shaft 1ᵃ and which is provided with a cam or collar 29 adapted to be engaged by a corresponding collar 30 loosely mounted on the driven shaft and actuated by means of a connecting rod in any desired manner.

In the practical operation, when the disk 24 is not turned so that none of its cam surfaces engage the pins, the springs 19 that are interposed between the disk 9 and the several rings 16, 17, and 18 will press said rings outwardly and thereby hold the bevel gears 13, 14 and 15 out of engagement with the pinions H, M and L. To engage the drive shaft 1 with the driven shaft 1ᵃ, the operator turns the disk 24 in a direction to cause the engagement of the cams 25 with the pins, and the first engagement will obviously press the outermost set of pins 22 inwardly and said pins will in turn press against the outermost ring 16 and move the same against the tension of the springs 19 so as to carry the low speed bevel gear 15 into meshing engagement with the low speed pinion L. A continued movement of the disk 24 in the same direction will effect the meshing engagement of the intermediate ring or gear 14 with the intermediate speed pinion M, while at the same time the gears 15 and L are still kept in mesh, and a still further movement of the disk 24 in the same direction will cause a corresponding engagement of the gears 13 and H to establish high speed, while at the same time the gears 14 and M are still kept in engagement as are also the gears 15 and L. It will thus be seen that a direct drive is effected on all speeds, that the arrangement allows all gears to be in mesh at the same time and that by this means, the operator is permitted to change from one speed to a higher speed without throwing any of the gears out of mesh and losing the headway that has been gained. The reverse movement is obvious, and it is manifest that in the reverse, the operator will be permitted to take a lower speed on a gradient without danger of slipping back, as is the case in those cases where the gears have to be thrown out when changing from one speed to another. In order to accomplish this result, it is evident that means must be provided for permitting the low and intermediate speed gears L and M to spin on the drive shaft or revolve thereon at a higher rate of speed than the shaft itself, as, otherwise they would be stripped. The pinions L and M, are, therefore, fitted with either a friction grip or ratchet drive, and in the present instance, for the purposes of illustration only, I have shown a type of friction grip which may be employed to accomplish the desired end.

For each of the pinions on the drive shaft, except the high speed pinion, we provide a sleeve 33 which is keyed or otherwise rigidly secured to the drive shaft 1 and which is encircled by an annular disk 32. To the disk 32 two or more eccentric arms 34 are pivoted, and said arms are connected at one end to links 35 that are in turn connected to the sleeve 33. Each eccentric arm 34 is preferably provided with a hardened insert or wear plate 37. When force is exerted on the drive shaft, it is obvious that the eccentric grips or arms 34 will expand and grip the pinions firmly. When a higher speed is in operation, the said arms will allow said pinions to revolve noiselessly on the drive shaft.

From the foregoing description in connection with the accompanying drawings, it will be seen that we have provided a very simple and efficient construction of variable speed gearing, in which all of the gears may be maintained in mesh at the same time with the consequent advantages resulting from this arrangement.

Of course, it is to be understood that our invention may be used with any differential or compensating gearing.

Having thus described the invention, what is claimed as new is:

1. The combination of a drive shaft, a driven shaft, a series of gear elements on the drive shaft and mounted for driving connection therewith, a series of gear elements all of which are movable with the driven shaft, and means for connecting said last named gear elements successively with the first named gear elements and for maintaining the gears one after another in mesh.

2. The combination of a drive shaft, high, intermediate, and low speed gear elements on said drive shaft, a driven shaft, a series of concentric gear rings mounted on and movable with the driven shaft, means for causing the successive engagement of said rings with the low speed gear element, intermediate speed gear element, and high speed gear element of the drive shaft, in turn and for holding each of the speed gear elements in mesh after another has been caused to mesh, and means for clutching the low and intermediate speed gear elements to the drive-shaft, said clutching means permitting said last named gear elements to over-run.

3. The combination of a drive shaft, a series of bevel pinions mounted on said shaft, a driven shaft mounted at substantially right angles to the drive shaft, a series of gear rings mounted on the driven shaft to move therewith and longitudinally adjustable on such shaft, means for moving said gear rings one after the other into engagement with said bevel pinions and for holding the previously meshed gears in engagement after a succeeding engagement has been effected, and means for clutching sundry of said bevel pinions to the drive shaft, said clutching means permitting the clutched pinions to over-run.

4. The combination of a drive shaft, a series of bevel pinions mounted thereon, a driven shaft, a series of bevel gear rings of different diameters mounted on said driven shaft to turn therewith and movable relatively on the shaft, and means for effecting a meshing engagement of the respective bevel gear rings with the bevel pinions in succession without disengaging any gear.

5. The combination of a drive shaft, high, intermediate, and low speed bevel pinions mounted on said shaft, the intermediate and low speed pinions having a clutching engagement with said shaft and adapted to turn free thereon when moved faster than the shaft itself in the forward rotation of the latter, the high speed pinion being fast on the shaft, a driven shaft, a series of concentrically mounted bevel gear rings on said driven shaft and mounted to turn therewith but independently movable longitudinally thereof, said rings being located in registry with the respective bevel pinions of the drive shaft, a cam mounted to turn on said driven shaft, means interposed between said gear rings and said cams for effecting the meshing engagement of one gear ring after the other with the respective pinions in turn, such means being actuated by said cam the arrangement being such that the continued movement of the disk in one direction will effect the successive engagement of the gears without disengaging any gear.

6. The combination of a drive shaft, a series of bevel pinions thereon, a driven shaft, a disk fast on said driven shaft and provided with a series of apertures extending therethrough, a series of bevel gear wheels mounted concentrically of each other and each provided with a set of spokes slidingly mounted in the apertures of said disks, concentric rings secured to the outer ends of the respective sets of spokes, a series of pinions for each of said rings, a support through which said pins are mounted to slide so as to move said rings inwardly, and a cam disk mounted on the driven shaft and provided with cam surfaces adapted to successively engage the different sets of pins and move them inwardly, the said cam surfaces being designed so as to effect the pushing in of one set of pins after the other and to hold all of said pins in pushed-in condition at the same time, as and for the purpose set forth.

7. The combination of a drive shaft, a series of bevel pinions thereon, a driven shaft, a disk fast on said driven shaft and provided with a series of apertures extending therethrough, a series of bevel gear wheels mounted concentrically of each other and each provided with a set of spokes slidingly mounted in the apertures of said disk, concentric rings secured to the outer ends of the respective sets of spokes, a series of pinions for each of said rings, a support through which said pins are mounted to slide so as to move said rings inwardly, and a cam disk mounted on the driven shaft and provided with cam surfaces adapted to successively engage the different sets of pins and move them inwardly, the said cam surfaces being designed so as to effect the pushing in of one set of pins after the other and to hold all of said pins in pushed-in condition at the same time, and springs encircling the said spokes and bearing against the first named disk and the concentric rings.

8. The combination of a drive shaft, a series of bevel pinions thereon, a driven shaft, a disk fast on said driven shaft and provided with a series of apertures extending therethrough, a series of bevel gear wheels mounted concentrically of each other and each provided with a set of spokes slidingly mounted in each of said rings, a support through which said pins are mounted to slide so as to move said rings inwardly, and a cam disk mounted on the driven shaft and provided with cam surfaces adapted to successively engage the different sets of pins and move them inwardly, the said cam surfaces being designed so as to effect the pushing in of one set of pins after the other and to hold all of said pins in pushed in condition at the same time, and springs encircling the said spokes and bearing against the first named disk and the concentric rings, the pins being provided with rollers at their inner ends adapted to bear upon the respective rings.

9. The combination of a drive shaft, a series of bevel pinions mounted thereon, a driven shaft at right angles to the drive shaft, a series of bevel gear rings mounted to turn on the drive shaft, and movable longitudinally of such shaft at one side of said bevel pinions, a reverse gear wheel mounted to turn on the driven shaft and movable longitudinally thereof and mounted to face said gear rings on the opposite side of said bevel pinions, means for moving said reverse gear wheel into engagement with one of said pinions, and means for moving the said gear rings into successive engagement with the pinions and for holding each ring in successive engagement while and after the next ring is moved into engagement with its pinion.

In testimony whereof we affix our signatures in presence of two witnesses.

JESSE G. HAWLEY. [L. S.]
CHARLES DOUGLAS HAWLEY. [L. S.]

Witnesses:
SARAH E. MITCHELL,
CHARLES H. PECK.